US007096044B2

(12) United States Patent
Gil et al.

(10) Patent No.: US 7,096,044 B2
(45) Date of Patent: Aug. 22, 2006

(54) CONCATENATED POINT-TO-MULTIPOINT (PTMP) BROADCAST MESSAGES DISPLAYING DISPLAY MESSAGES IN CELLULAR PHONES

(75) Inventors: Amit Gil, Yehud (IL); Shav Hilel, Tel Mond (IL); Eitan Lupovich, Ramat Gan (IL)

(73) Assignee: Celltick Technologies Ltd., Herzliya (IL)

( * ) Notice: Subject to any disclaimer, the term of this patent is extended or adjusted under 35 U.S.C. 154(b) by 263 days.

(21) Appl. No.: 10/485,733

(22) PCT Filed: Aug. 16, 2001

(86) PCT No.: PCT/IL01/00775

§ 371 (c)(1),
(2), (4) Date: Feb. 4, 2004

(87) PCT Pub. No.: WO03/017701

PCT Pub. Date: Feb. 27, 2003

(65) Prior Publication Data

US 2004/0248620 A1    Dec. 9, 2004

(51) Int. Cl.
*H04M 1/00*    (2006.01)
*H04Q 7/20*    (2006.01)
*G06F 7/00*    (2006.01)
*G06F 15/16*   (2006.01)

(52) U.S. Cl. .............. 455/566; 455/466; 455/567; 709/236; 709/246; 715/733

(58) Field of Classification Search ........ 455/458–459, 455/566, 567, 466; 709/236, 246
See application file for complete search history.

(56) References Cited

U.S. PATENT DOCUMENTS 6,141,550 A    10/2000  Ayabe et al.
6,522,877 B1 *  2/2003  Lietsalmi et al. ........ 455/422.1
6,717,925 B1 *  4/2004  Leppisaari et al. .......... 370/312

FOREIGN PATENT DOCUMENTS

WO    WO 01/52558 A2    7/2001

\* cited by examiner

*Primary Examiner*—George Eng
*Assistant Examiner*—Michael Thier
(74) *Attorney, Agent, or Firm*—Nath & Associates PLLC; Harold L. Novick

(57) ABSTRACT

The present invention is directed to the use of concatenatable Point-To-MultiPoint (PTMP) broadcast messages for displaying display messages, and in particular long display messages requiring two or more PTMP broadcast messages, on personal cellular telecommunications devices. The present invention is achieved by the provision of a pseudo-header including a display message identifier, a PTMP broadcast message field for specifying the number $P \geq 1$ of PTMP broadcast messages to transport an entire display message, and a PTMP broadcast message counter $Q=(1, 2, \ldots, P-1, P)$ for specifying the location of a PTMP broadcast message in that sequence. A pseudo-header may alternatively enable concatenation of two or more macromessages into a supermacromessage.

34 Claims, 13 Drawing Sheets

CONCATENATED POINT-TO-MULTIPOINT (PTMP) BROADCAST MESSAGES DISPLAYING DISPLAY MESSAGES IN CELLULAR PHONES

FIELD OF THE INVENTION

The invention is in the field of mobile cellular telecommunications in general, and the use of concatenatable Point-To-MultiPoint (PTMP) broadcast messages for displaying display messages on personal cellular telecommunications devices in particular.

BACKGROUND OF THE INVENTION

In Applicant's WO 01/52558 A2 entitled "Method for Operating a Cellular Telecommunications Network, and Method for Operating a Personal Cellular Telecommunications Device" and WO 01/52572 A1 entitled "Method for Operating a Cellular Telecommunications Network", the contents of which are incorporated herein by reference, there is illustrated and described a screen saver application for displaying display messages on personal cellular telecommunications devices in a screen saver like manner, namely, their display is temporarily interrupted during, say, a voice call, an Internet session, and the like. The display messages are preferably so-called "interactive display messages" in the sense that a subscriber can automatically activate a Point-To-Point (PTP) transmission response mechanism from a dedicated response means integrally provided in a display message. Interactive display messages are preferably transmitted over a Point-To-MultiPoint (PTMP) transmission capability as opposed to over a PTP transmission capability, thereby rendering an interactive cellular broadcasting service.

ETSI's GSM 03.41 standard entitled "Technical Realization of Cellular Broadcast Service", the contents of which are incorporated herein by reference, standardizes a so-called "macromessage" constituted by between one and 15 broadcast messages each having a 82 byte payload for transporting long display messages of up to a maximum of 1230 bytes. This upper limit of 15 broadcast messages is due to the provisioning of only 4 bits for the purpose of specifying the number of pages in a macromessage i.e. 1111. Despite the inclusion of the macromessage feature since the inception of the GSM 03.41 standard, neither do many installed GSM Cell Broadcast Controllers (CBCs) employed for parsing an display message into broadcast messages support the macromessage feature, nor do many Base Station Controllers (BSCs) for transmitting the broadcast messages and nor do many GSM personal cellular telecommunications devices. Looking to the future, assuming that all installed CBCs, BSCs and devices support the macromessage capability, the maximum 1230 byte payload of a macromessage may be insufficient to transport certain bandwidth heavy display messages, for example, including video content.

SUMMARY OF THE INVENTION

Generally speaking, the present invention is directed to the use of concatenatable Point-To-MultiPoint (PTMP) broadcast messages for displaying display messages on personal cellular telecommunications devices in a robust manner entirely independent of the macromessage capability of a transmitting BSC or the individual macromessage capability of a receiving personal cellular telecommunications device. Moreover, the present invention is capable of concatenating a far greater number of PTMP broadcast messages than the maximum concatenation capability of GSM 03.41's macromessage feature, thereby effectively enabling the CB channels dedicated for broadcast messages to be employed for transporting mobile services, for example, WAP, and the like.

The present invention is implemented by reserving a portion of the payload of an otherwise conventional PTMP broadcast message for concatenation purposes including concatenation of two or more PTMP broadcast messages and/or concatenation of two or more macromessages into a so-called supermacromessage. The reserved portions of the payloads of PTMP broadcast messages are therefore effectively pseudo-headers whose contents do not constitute part of the display message per se. However, whilst the pseudo-headers of PTMP broadcast messages in accordance with the present invention effectively replace the functionality of their header counterparts when used, there still exist network advantages for transmitting PTMP broadcast messages as part of macromessages where possible.

A client application for displaying display messages transported over an air interface in accordance with the present invention is preferably customizable for execution on either a non-macromessage compliant device or a macromessage compliant device. The customization is preferably achieved by way of a customization protocol, for example, as illustrated and described Applicant's co-pending PCT International Applications PCT/IL01/00165 and PCT/IL01/00424, the contents of which are incorporated herein by reference.

The personal cellular telecommunications devices can include a wide range of mobile handheld devices including inter alia simple phones, Smartphones, Communicators, Wireless Information Devices (WIDs), and the like. The client applications can be developed under different industry wide and proprietary development environments, and can run on different Operating Systems (O/Ss) including inter alia Microsoft CE, Symbian EPOC, Palm O/S, and the like.

BRIEF DESCRIPTION OF THE DRAWINGS

In order to understand the invention and to see how it can be carried out in practice, a preferred embodiment will now be described, by way of a non-limiting example only, with reference to the accompanying drawings, in which similar parts are likewise numbered, and in which.

DETAILED DESCRIPTION OF THE DRAWINGS

Figure 1:
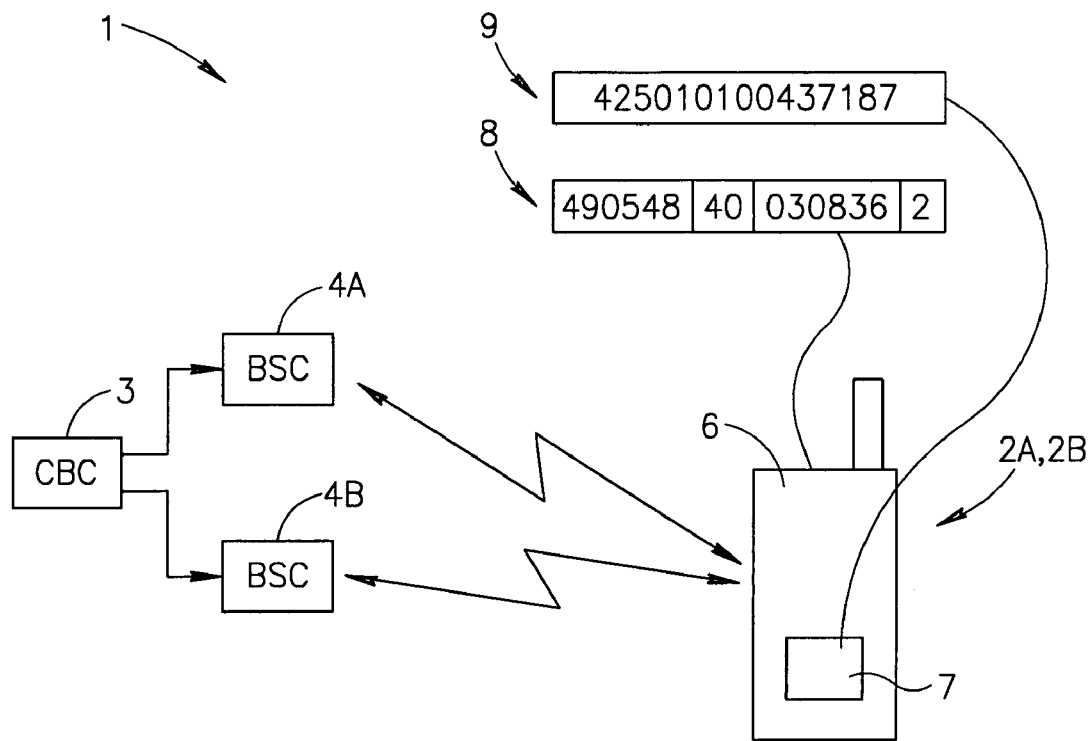
FIG. 1 shows a schematic representation of a GSM mobile cellular telecommunications network for displaying display messages on personal cellular telecommunications devices.

FIG. 1 shows a GSM cellular telecommunications network 1 for displaying display messages on personal cellular telecommunications devices (hereinafter referred to as "devices") 2. The network 1 includes a Cell Broadcast Controller (CBC) 3 for parsing a display message into PTMP broadcast messages to be broadcasted from one of two classes of Base Station Controller (BSC) 4, namely, non-macromessage compliant BSCs 4A and macromessage compliant BSCs 4B. Each device 2 includes a host Mobile Equipment (ME) 6, and a resident Subscriber Identity Module (SIM) card 7 capable of running SIM Toolkit applications (constituting client applications). Each host ME 6 has its own unique vendor allocated 15 digit International Mobile Equipment Identification (IMEI) number 8, for example, 490548400308362. Each SIM 7 has a cellular operator allocated 15 digit International Mobile Subscriber Identity (IMSI) number 9, for example, 425010100437187. A device 2 can be either a non-macromessage compliant device 2A or a macromessage compliant device 2B, and its macromessage compliancy can be determined by way of a customization protocol employing either its IMEI or its IMSI, for example, as illustrated and described in Applicant's co-pending PCT International Applications PCT/IL01/00165 and PCT/IL01/00424, the contents of which are incorporated herein by reference.

Figure 2:
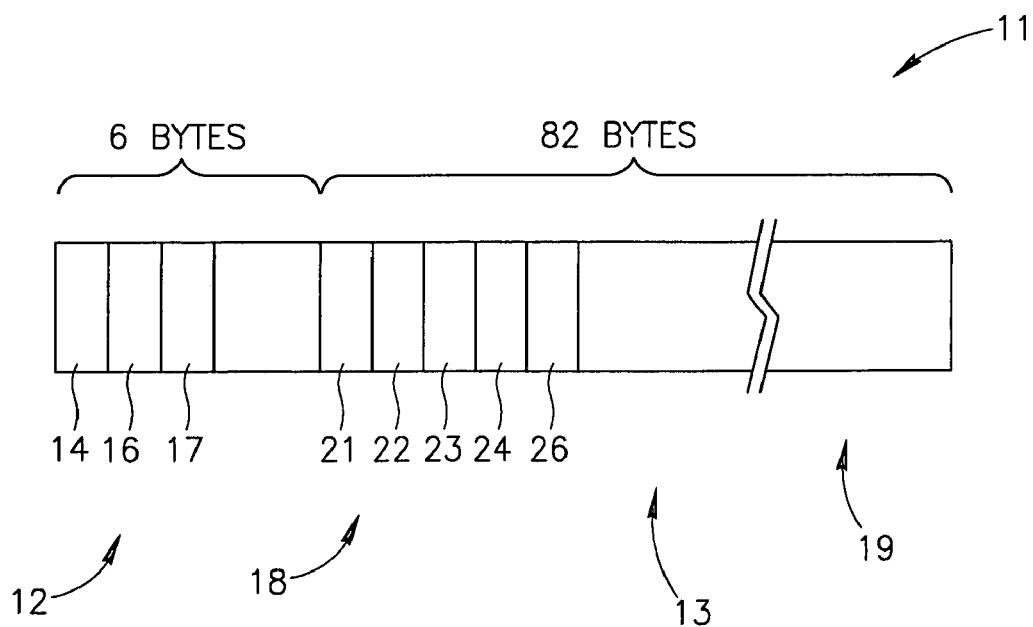
FIG. 2 is a schematic diagram showing a preferred embodiment of a GSM-type modified PTMP broadcast message for displaying display messages in accordance with the present invention.
Figure 3A:
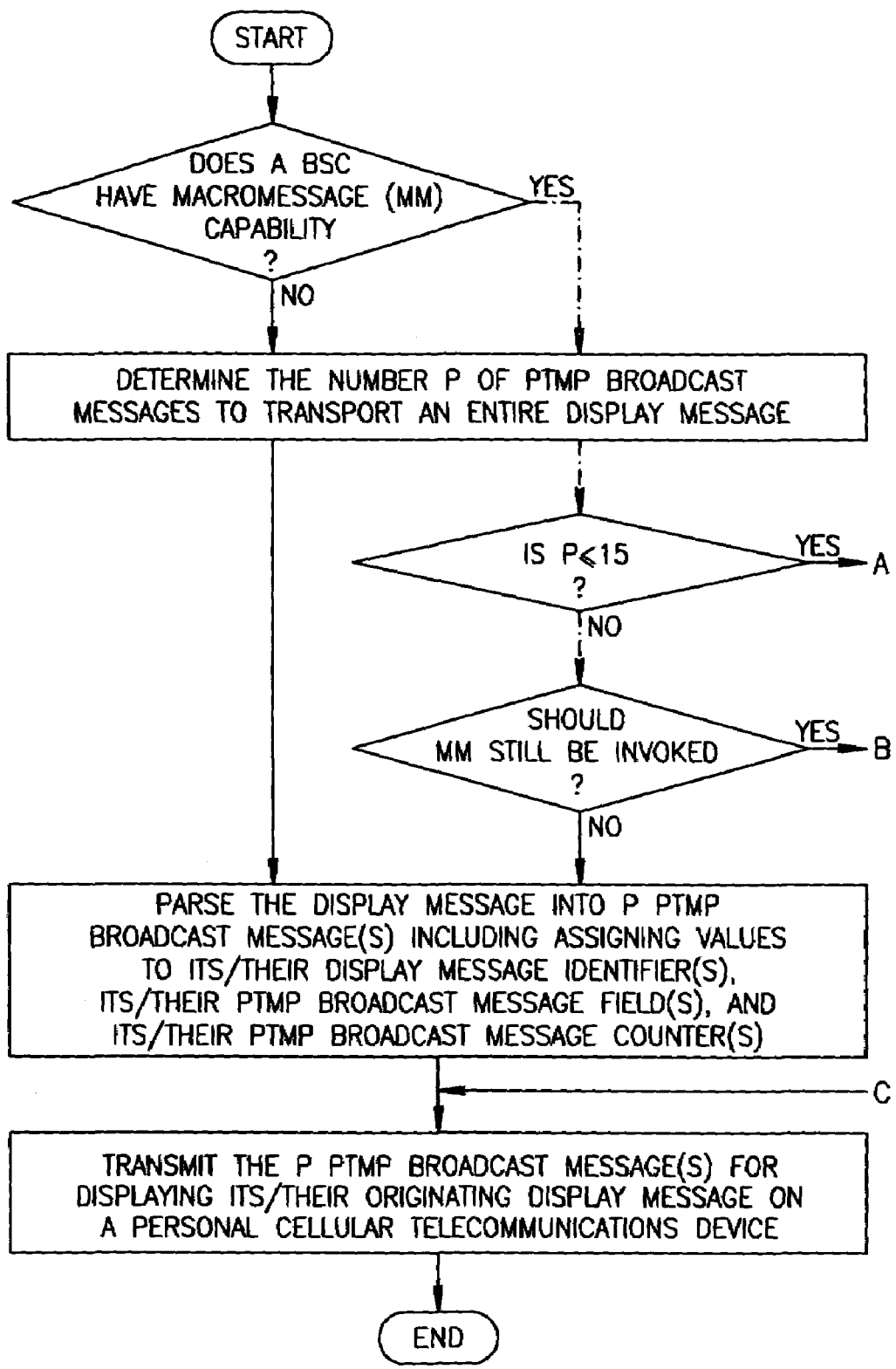
FIGS. 3A and 3B are flow diagrams showing the parsing of a display message into PTMP broadcast messages ready for broadcasting in accordance with the present invention.
Figure 3B:
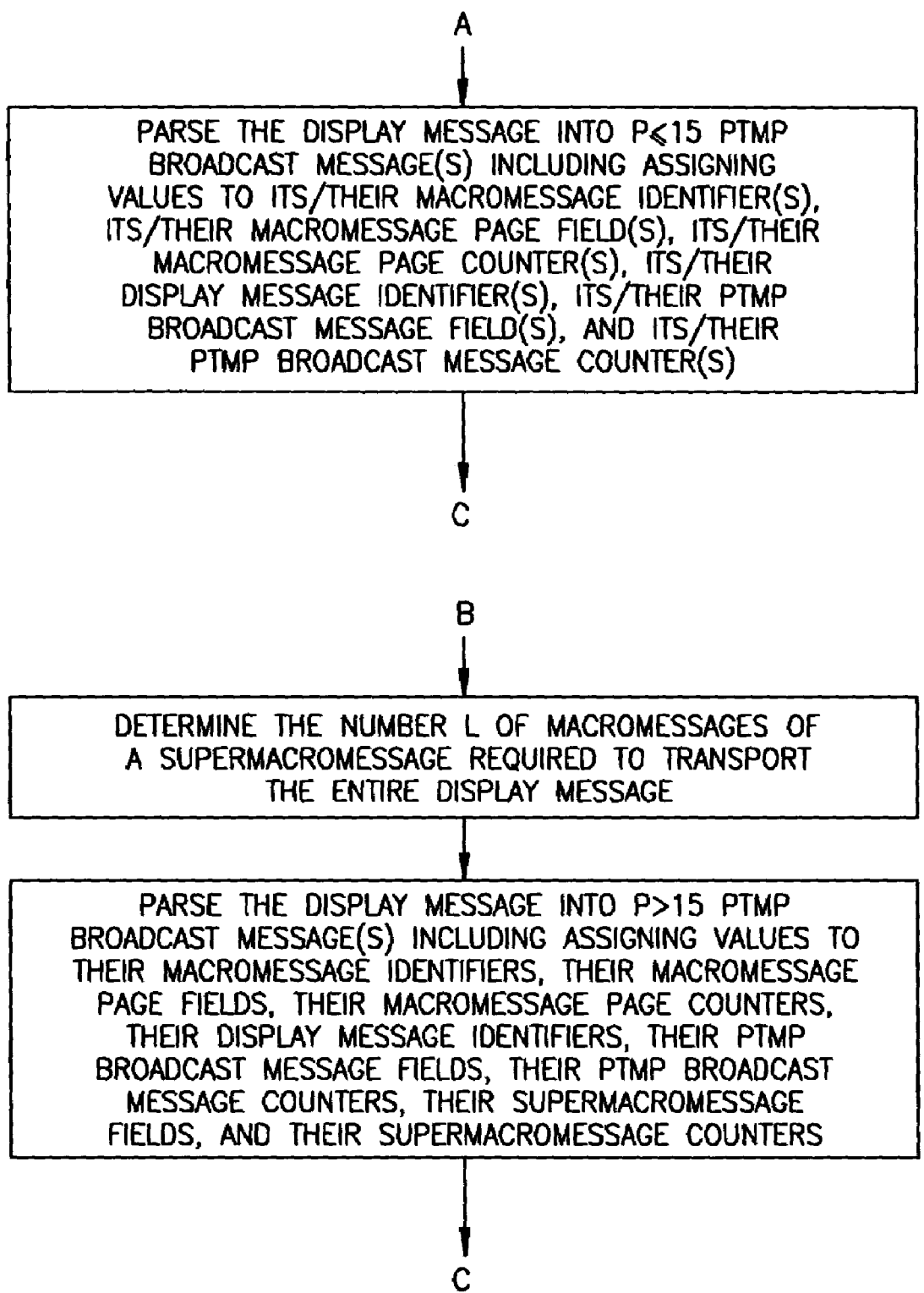
Figure 4:
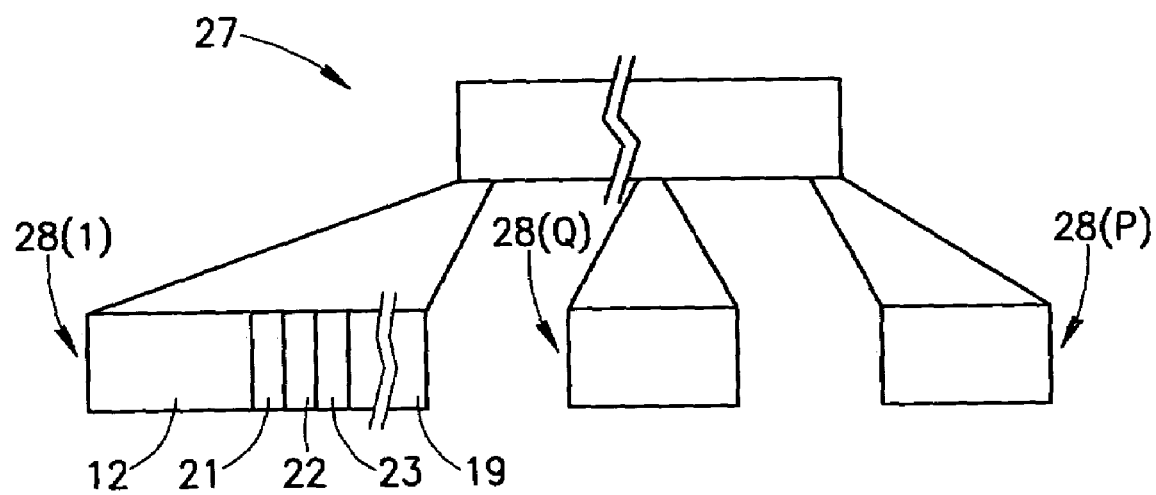
FIG. 4 is a schematic diagram showing the parsing of a display message into a sequence of GSM-type individual PTMP broadcast messages in accordance with a first mode of parsing.
Figure 5:
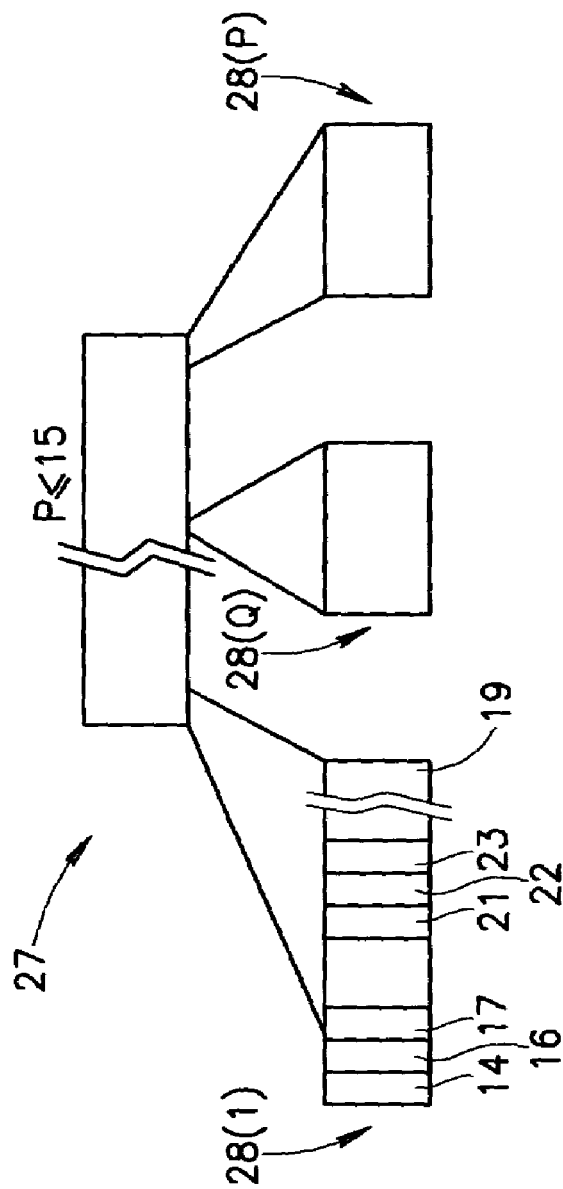
FIG. 5 is a schematic diagram showing the parsing of a display message into a GSM-type macromessage of PTMP broadcast messages in accordance with a second mode of parsing.
Figure 6:
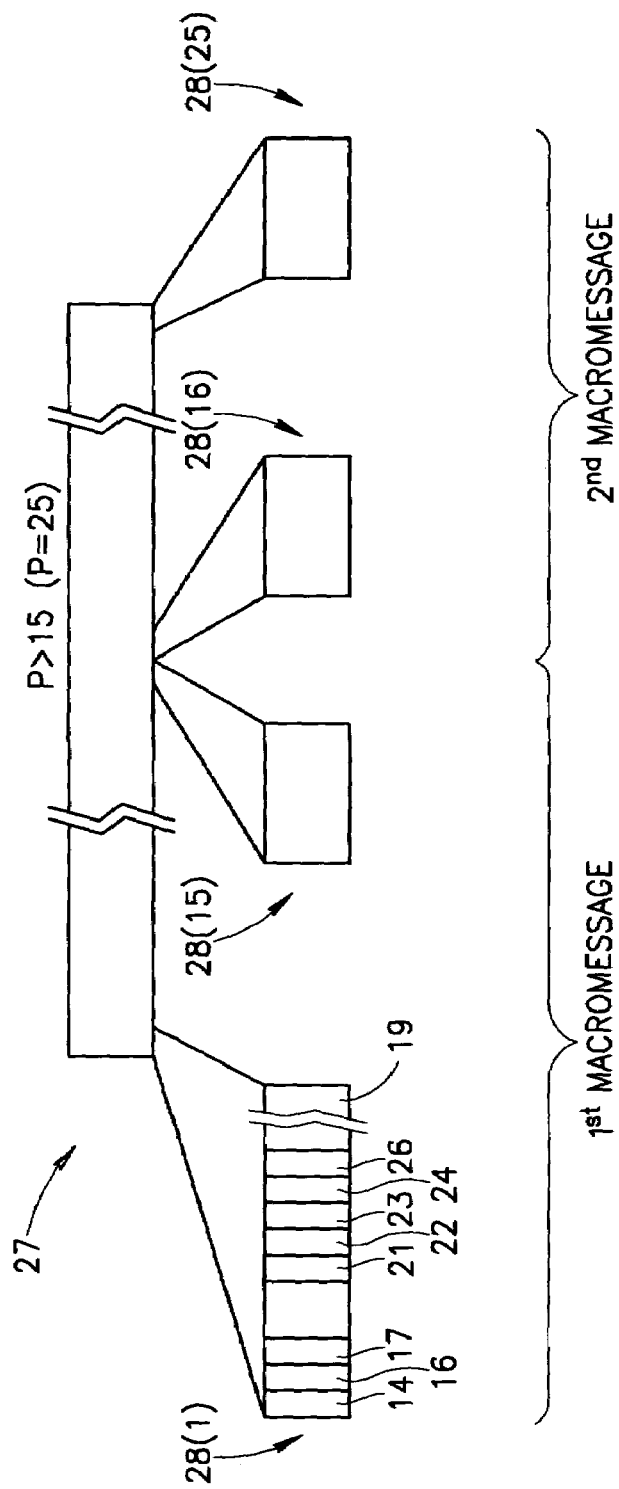
FIG. 6 is a schematic diagram showing the parsing of a display message into a supermacromessage of GSM-type macromessages in accordance with a third mode of parsing.

FIG. 2 shows that a modified GSM-type PTMP broadcast message 11 is based on a conventional PTMP broadcast message having 88 bytes divided between a 6 byte header 12 and a 82 byte payload 13. The header 12 includes a macromessage identifier 14 for identifying a macromessage, a macromessage page field 16 for specifying an integer I of pages in a macromessage where $K \geq I \geq 1$ and K is a predetermined maximum number of PTMP broadcast messages in a macromessage (K=15 for a GSM-type macromessage), and a macromessage page counter 17 for specifying a page number $J=(1, 2, \ldots, I-1, I \leq 15)$ of a PTMP broadcast message in a macromessage. The value J is incremented by 1 for each consecutive PTMP broadcast message in a macromessage. The payload 13 includes a reserved pseudo-header 18, and a payload remainder 19 for storing the actual content of an intended display message including inter alia display instructions, text, graphics, and the like. The pseudo-header 18 has a display message identifier 21 for identifying a display message, a PTMP broadcast message field 22 for specifying a value $P \geq 1$ of the number of PTMP broadcast messages required to transport an entire display message, and a PTMP broadcast message counter 23 $Q=(1, 2, \ldots, P-1, P)$ for specifying the location of a PTMP broadcast message in a sequence of P PTMP broadcast messages. The value Q is incremented by 1 for each consecutive PTMP broadcast message in a sequence of P PTMP broadcast messages. The pseudo-header 18 also includes a supermacromessage field 24 for specifying the number of macromessages $L \geq 1$ required to transport an entire display message, and a supermacromessage counter 26 $M=(1, 2, \ldots, L-1, L)$ for specifying the location of a macromessage in a supermacromessage. The value M is incremented by 1 for each consecutive macromessage in a supermacromessage.

The operation of the GSM mobile cellular telecommunications network 1 is now described with reference to FIGS. 3–9 in respect of both non-macromessage compliant devices 2A and macromessage compliant devices 2B, and both non-macromessage compliant BSCs 4A and macromessage compliant BSCs 4B.

In the case of either a BSC 4A or a BSC 4B, the CBC 3 initially determines the number $P \geq 1$ of PTMP broadcast messages required to transport an entire display message 27. In the case of a BSC 4A, the CBC 3 parses the display message 27 into P PTMP broadcast messages 28 including assigning values to its/their display message identifier(s) 21, PTMP broadcast message field(s) 22 and PTMP broadcast message counter(s) 23 prior to transmission at the BSC 4A for display of its/their originating display message 27 on a device 2A or 2B (see solid line in FIG. 3, and FIG. 4): The CBC 3 assigns the same identification number 123456 to its/their display message identifier(s) 21. The CBC 3 assigns the same value P to its/their PTMP broadcast message field(s) 22. The CBC 3 assigns a value $Q=(1, 2, \ldots, P-1, P)$ to its/their PTMP broadcast message counter(s) 23 where the value Q is incremented by 1 for each consecutive PTMP broadcast message 28 of the P PTMP broadcast message(s) 28. Also, the CBC 3 can assign default values, say, L=M=0, to its/their supermacromessage field(s) 24 and its/their supermacromessage counter(s) 26.

In the case of a BSC 4B and $P \leq 15$, the CBC 3 and the BSC 4B parse the display message 27 into $P \leq 15$ PTMP broadcast messages 28 including assigning values to its/their macromessage identifier(s) 14, macromessage page field(s) 16, macromessage page counter(s) 17, display message identifier(s) 21, PTMP broadcast message field(s) 22 and PTMP broadcast message counter(s) 23 prior to the $P \leq 15$ PTMP broadcast message(s) 28 being ready for transmitting at the BSC 4B for displaying its/their originating display message 29 on a device 2A or 2B (see hashed line in FIG. 3, and FIG. 5): The CBC 3 allocates the identification number 171717 for assigning to its/their macromessage identifier(s) 14 by the BSC 4B. The 4B assigns the same value I to its/their macromessage page field(s) 16, and a value J to its/their macromessage page counter(s) 17. Typically, the I and Q values of its/their macromessage page field(s) 13 and macromessage page counters(s) 17 are the same as the P and Q values of their counterpart PTMP broadcast field(s) 22 and PTMP broadcast counter(s) 23, respectively. The CBC 3 assigns the same identification number 232323 to its/their display message identifier(s) 21. The CBC 3 assigns the same value P to its/their PTMP broadcast message field(s) 22. The CBC 3 assigns a value Q=(1, 2, . . . , P-1, P≦15) to its/their PTMP broadcast message counter(s) 23 where Q is incremented by 1 for each consecutive P≦15 PTMP broadcast message 28 of the P≦15 PTMP broadcast message(s) 28. The CBC 3 can also assign default values, say, L=M=0, to its/their supermacromessage field(s) 24 and its/their supermacromessage counter(s) 26.

In the case of a BSC 4B and P>15, a decision has to be made whether to still utilize the BSC's macromessage capability or not. In the event that its macromessage capability is not to be utilized, then the display message is parsed into P>15 PTMP broadcast messages in the same manner as in the case of a BSC 4A prior to transmission at the BSC 4B for displaying their originating display message 27 on a device 2A or 2B.

In the event that its macromessage capability is still to be utilized, the CBC 3 determines the length of a supermacromessage in terms of the number L>1 of macromessages required to transport the entire display message 27. The CBC 3 and the BSC 4B parse the display message 27 into the P>15 PTMP broadcast messages including assigning values to their macromessage identifiers 14, macromessage page fields 16, macromessage page counters 17, display message identifiers 21, PTMP broadcast message fields 22, PTMP broadcast message counters 23, supermacromessage fields 24, and supermacromessage counters 26 prior to transmission at the BSC 4B for displaying their originating display message 27 on a device 2A or 2B (see hashed line in FIG. 3, and FIG. 6): The CBC 3 allocates the identification numbers for the different macromessages for assigning to their macromessage identifiers 14 by the BSC 4B. For example, assuming that P=25, the display message 27 is transportable by a supermacromessage consisting of two macromessages, the first macromessage being complete with 15 PTMP broadcast messages 28(1), . . . , 28(15), and the second macromessage having 10 PTMP broadcast messages 28(16), . . . , 28(25). In the shown example, the CBC 3 allocates the value 454545 to the macromessage identifiers 14 of the $1^{st}$ macromessage, and the value 474747 to the macromessage identifiers 14 of the $2^{nd}$ macromessage.

The BSC 4B assigns the value I=15 to the macromessage page field 16 of each PTMP broadcast message of a complete macromessage, and the value I=P-[15×(L-1)] to the macromessage page field 16 of the last typically incomplete macromessage. The BSC 4B assigns a value J=(1, 2, . . . , 15) to the macromessage page counters 17 of each PTMP broadcast message of a complete macromessage where the value J is incremented by 1 for each consecutive PTMP broadcast message of a macromessage, and the value J=(1, 2, . . . , P-[15×(L-1)]) to the macromessage page counters 17 of the PTMP broadcast messages of the last typically incomplete macromessage. In the above example, the BSC 4B assigns the value I=15 to the macromessage page fields 16 of all 15 PTMP broadcast messages 28 of the $1^{st}$ macromessage, and a J=(1, 2, . . . , 15) to their macromessage page counters 17. Also, the BSC 4B assigns the value I=10 to the macromessage page fields 21 of all 10 PTMP broadcast messages 28 of the $2^{nd}$ macromessage, and a Q=(1, 2, . . . , 10) to their macromessage page counters 17.

The CBC 3 assigns the same identification number 123123 to the display message identifiers 21 of all 25 PTMP broadcast messages. The CBC 3 assigns the same value P to the PTMP broadcast message fields 21 of all 25 PTMP broadcast messages, and values Q=(1, 2, . . . , P-1, P) to their PTMP broadcast message counters 23 where the value Q is incremented by 1 for each consecutive PTMP broadcast message. The CBC 3 also assigns the same value L to the supermacromessage fields 24 of all 25 PTMP broadcast messages, and a value M=(1, 2, . . . , L-1, L) to their supermacromessage counters 26 where M is incremented by 1 for each consecutive macromessage in a supermacromessage. In the above example, the CBC 3 assigns the value P=25 to the PTMP broadcast messages fields 22, the values Q=(1, 2, . . . , 21, 25) to their PTMP broadcast message counters 23, the value L=2 to the supermacromessage fields 24 of all 25 PTMP broadcast messages 28, the value M=1 to the supermacromessage counters 26 of the 15 PTMP broadcast messages of the $1^{st}$ macromessage, and the value M=2 to the supermacromessage counters 26 of each of the 10 PTMP broadcast messages of the $2^{nd}$ macromessage.

A non-macromessage compliant device 2A is, by definition, unable to interpret macromessage information contained in the header of a PTMP broadcast message and therefore as a consequence handles PTMP broadcast messages 11 originating from either a BSC 4A or a BSC 4B in the same manner, namely, it processes the information stored in their pseudo-headers 18. In contrast, a macromessage compliant device 2B handles incoming PTMP broadcast messages originating from a BSC 4A and a BSC 4B differently.

Figure 7:
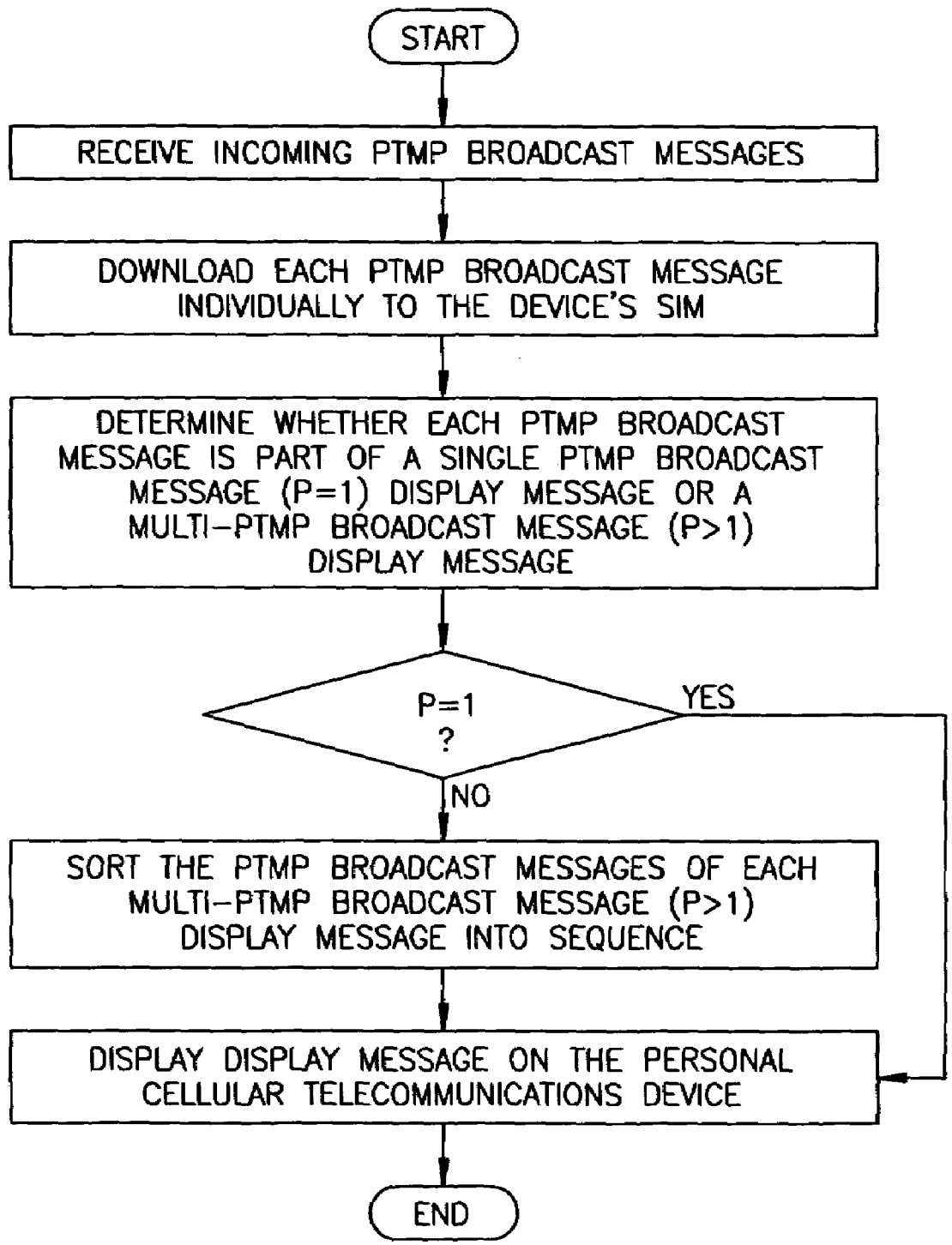
FIG. 7 is a flow diagram of a client application for displaying a display message on a non-macromessage compliant personal cellular telecommunications device in accordance with the present invention.

Turning to FIG. 7, a device 2A receives incoming PTMP broadcast messages 11 which are individually automatically downloaded in their entirety to its SIM 7. The client application determines from its PTMP broadcast message field 22 whether a PTMP broadcast message is part of a single PTMP broadcast message (P=1) display message or a multi-PTMP broadcast message (P>1) display message. In the former case, the client application strips off its header 12 and its pseudo-header 18, and processes its payload remainder 19 for yielding the contents of the display message for display on the device 2A. In the latter case, the client application sorts the P PTMP broadcast messages of a display message into sequence by their PTMP broadcast message counters 23 and then processes their payload remainders 19 for yielding the contents of the display message for display on the device 2A. After a predetermined timeout, the client application discards any incomplete display messages.

Figure 8A:
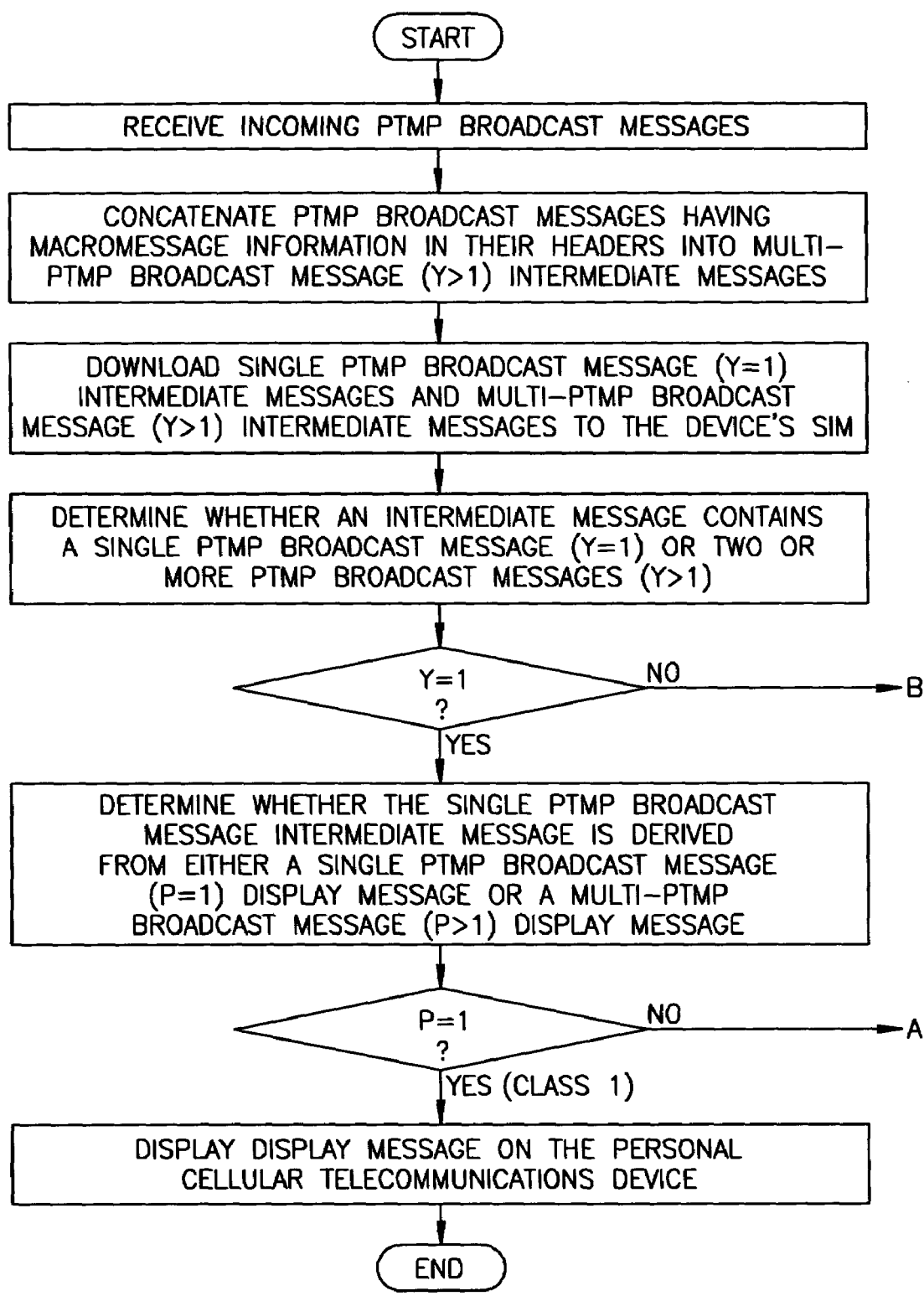
FIGS. 8A and 8B are flow diagrams of a client application for displaying a display message on a macromessage compliant personal cellular telecommunications device in accordance with the present invention.
Figure 8B:
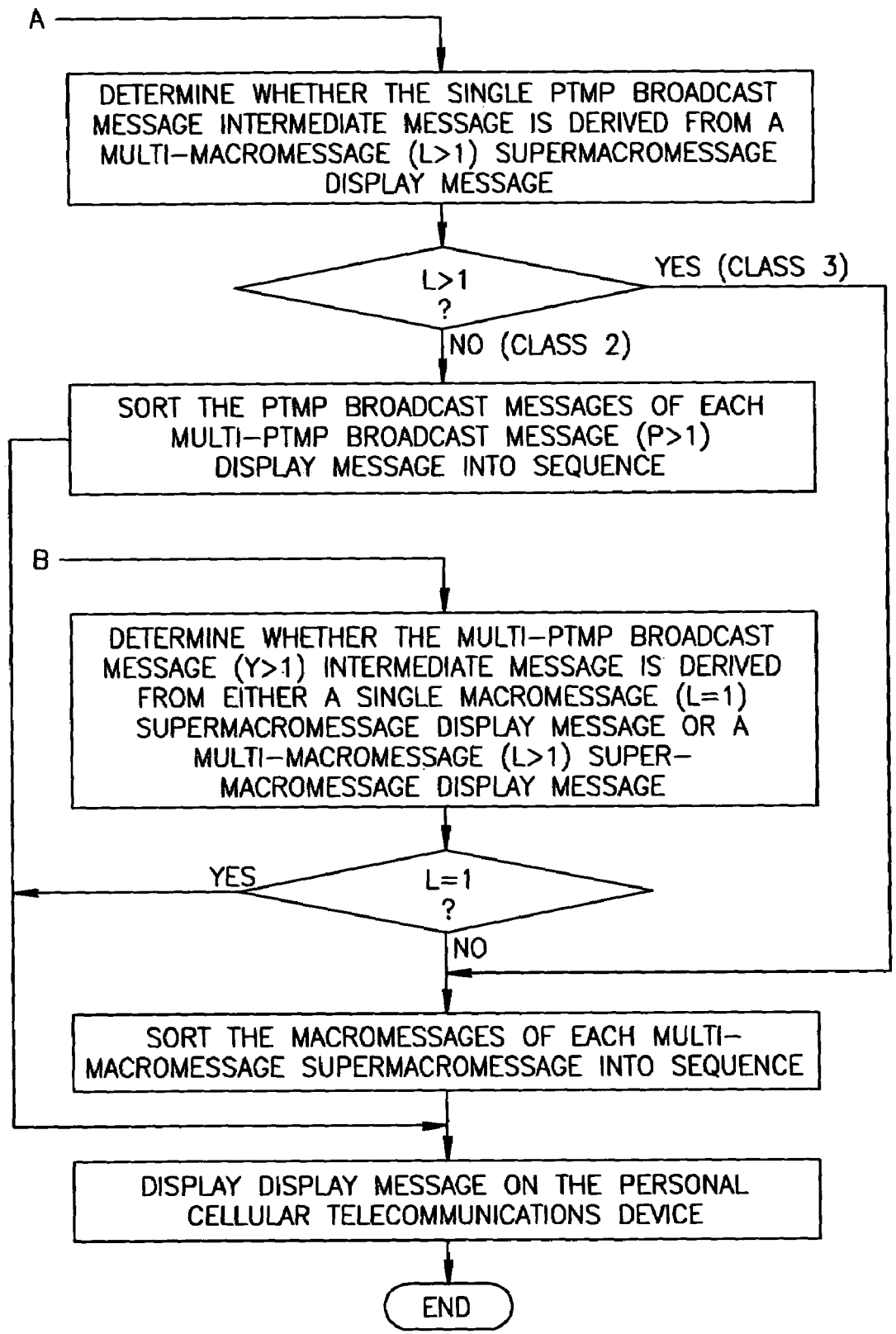

Turning to FIG. 8, in the case of a device 2B receiving incoming PTMP broadcast messages, its ME 6 automatically attempts to process them by macromessage information potentially contained in their headers, namely, to order the PTMP broadcast messages of each macromessage in sequence. In the case of PTMP broadcast messages transmitted by a BSC 4A, since their headers are devoid of macromessage information, the ME 6 cannot process them and therefore they are individually downloaded to the SIM 7 as single PTMP broadcast message intermediate messages. Each such intermediate message is in actual fact identical to its originating PTMP broadcast message in the sense that it has an identical header and an identical payload.

Figure 9:
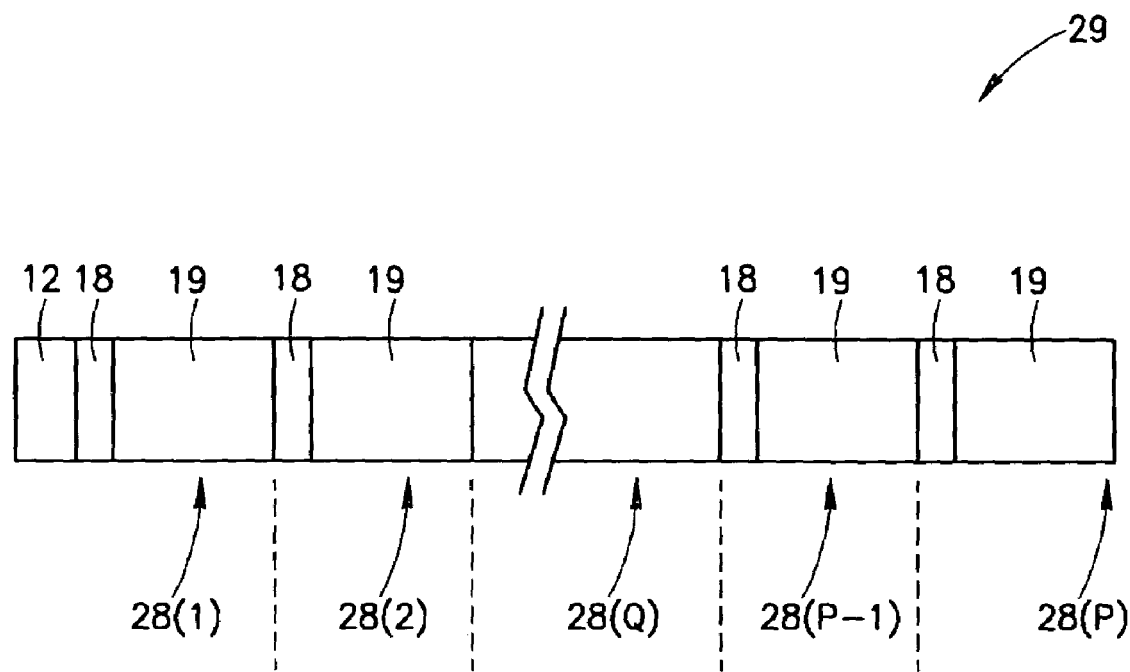
FIG. 9 is a schematic diagram showing an intermediate message yielded during the operation of the personal cellular telecommunications device of FIG. 8 for displaying of a display message.

In the case of PTMP broadcast messages transmitted by a BSC 4B and therefore containing macromessage information, the ME 6 is able to process them to generate intermediate messages derived from one or more PTMP broadcast messages and up to 15 PTMP broadcast messages for downloading to the SIM 7. In the event that an intermediate message is derived from a single PTMP broadcast message (P=1) display message, its subsequent intermediate message is also identical to its originating PTMP broadcast message in the sense that it has an identical header and an identical payload. In the event that an intermediate message is derived from a multi-PTMP broadcast message display message, each such intermediate message has a header identical to the header of its first PTMP broadcast message, and a payload including the pseudo-header of its first PTMP broadcast message and its payload remainder, and the entire payloads of its remaining P−1 PTMP broadcast messages including their pseudo-headers spaced therealong at regular intervals. FIG. 9 shows the intermediate message 29 which would be yielded on receipt of the P≦15 PTMP broadcast messages 28 derived from the display message 27 described hereinabove with reference to FIG. 5. After a predetermined timeout, the ME 6 discards any incomplete macromessages.

The client application determines whether an intermediate message is derived from a single PTMP broadcast message (Y=1) display message or a multi-PTMP broadcast message (Y>1) display message. In the former case, such an intermediate message can be classified into one of three categories: Class 1 in the event it derives from a single PTMP broadcast message (P=1) display message transmitted by either a BSC 4A or a BSC 4B. Class 2 in the event it derives from a multi-PTMP broadcast message (P>1) display message transmitted by a BSC 4A. And Class 3 in the event it derives from a single PTMP broadcast message of a last incomplete macromessage of a two or more macromessage (L>1) supermacromessage, for example, the $16^{th}$ or the $31^{st}$ PTMP broadcast message of a multi-PTMP broadcast message display message, transmitted by a BSC 4B.

In the case that an intermediate message is derived from a single PTMP broadcast message (P=1) display message as determined from its PTMP broadcast message field 22, the client application strips off its header 12 and its pseudo-header 18, and processes its payload remainder 19 for yielding the contents of the display message for display on the device 2B. In the event that such an intermediate message is not derived from a single PTMP broadcast message (P=1) display message, it is necessary to determine from its supermacromessage field 24 whether it falls into either Class 2 or 3. In the case that such an intermediate message falls into Class 2, it is processed in the same manner as described above with reference to a non-macromessage compliant device 2A, namely, the client application sorts the P PTMP broadcast messages of a multi-PTMP broadcast message (P>1) display message into sequence by their PTMP broadcast message counters 23 and then processes their payload remainders 19 for yielding the contents of the display message for display on the device 2B.

In the case that an intermediate message is derived from two or more PTMP broadcast messages indicative of their transmission by a BSC 4B, the client application determines from either the PTMP broadcast message field 22 or the supermacromessage field 24 of the first PTMP broadcast message whether it is derived from a single macromessage (P≦15) display message or a multi-macromessage (P>15) display message. In the former case, the client application strips off the header 12 and the pseudo-headers 18 of the PTMP broadcast messages before processing the payload remainders 19 of all the PTMP broadcast messages of the intermediate message for yielding the content of the display message for display on the device 2B. In the latter case, the client application treats the intermediate message in the same manner as described for the former case that a PTMP broadcast message is derived from a single macromessage (P≦15) display message but it concatenates the two or more macromessages of a supermacromessage including a single PTMP broadcast message (Y=1) macromessage derived from a Class 3 intermediate message as identified by their display message identifiers 21 in sequence prior to displaying the display message on the device 2B.

Figure 10:
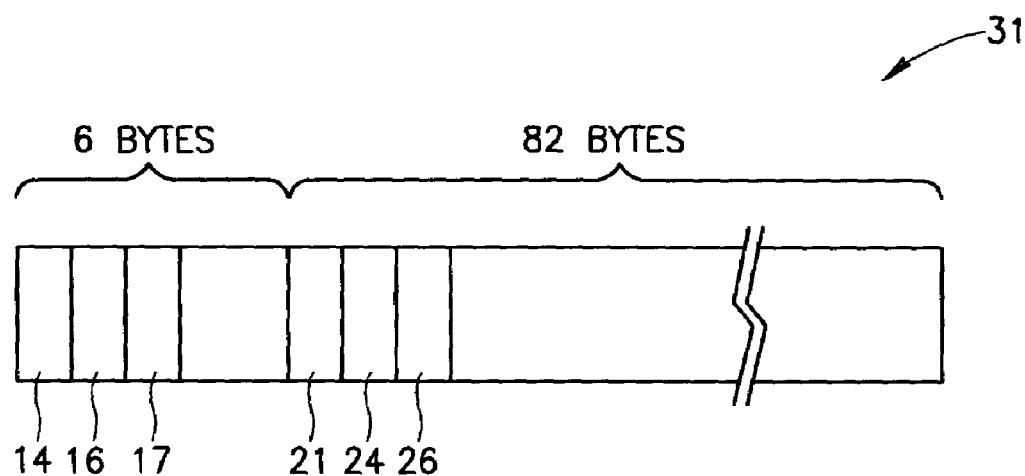
FIG. 10 is a schematic diagram showing a preferred embodiment of a GSM-type modified PTMP broadcast message of the first PTMP broadcast message of a macromessage for concatenating macromessages into supermacromessages in accordance with the present invention.

In the case of a display message being transmitted by a macromessage compliant BSC 4B for display on a device 2B, the concatenation of the PTMP broadcast messages of a macromessage is transparent to the device 2B, and therefore support of a supermacromessage capability is in practice equivalent to support of the concatenation of PTMP broadcast messages on a non-macromessage compliant device 2A. To this end, each macromessage requires that only its first PTMP broadcast message 31 (see FIG. 10) has the pseudo-header 18 with the display message identifier 21, the supermacromessage field 24 and the supermacromessage counter 26 whilst its other up to 14 PTMP broadcast messages may have full 82 byte payloads.

Figure 11:
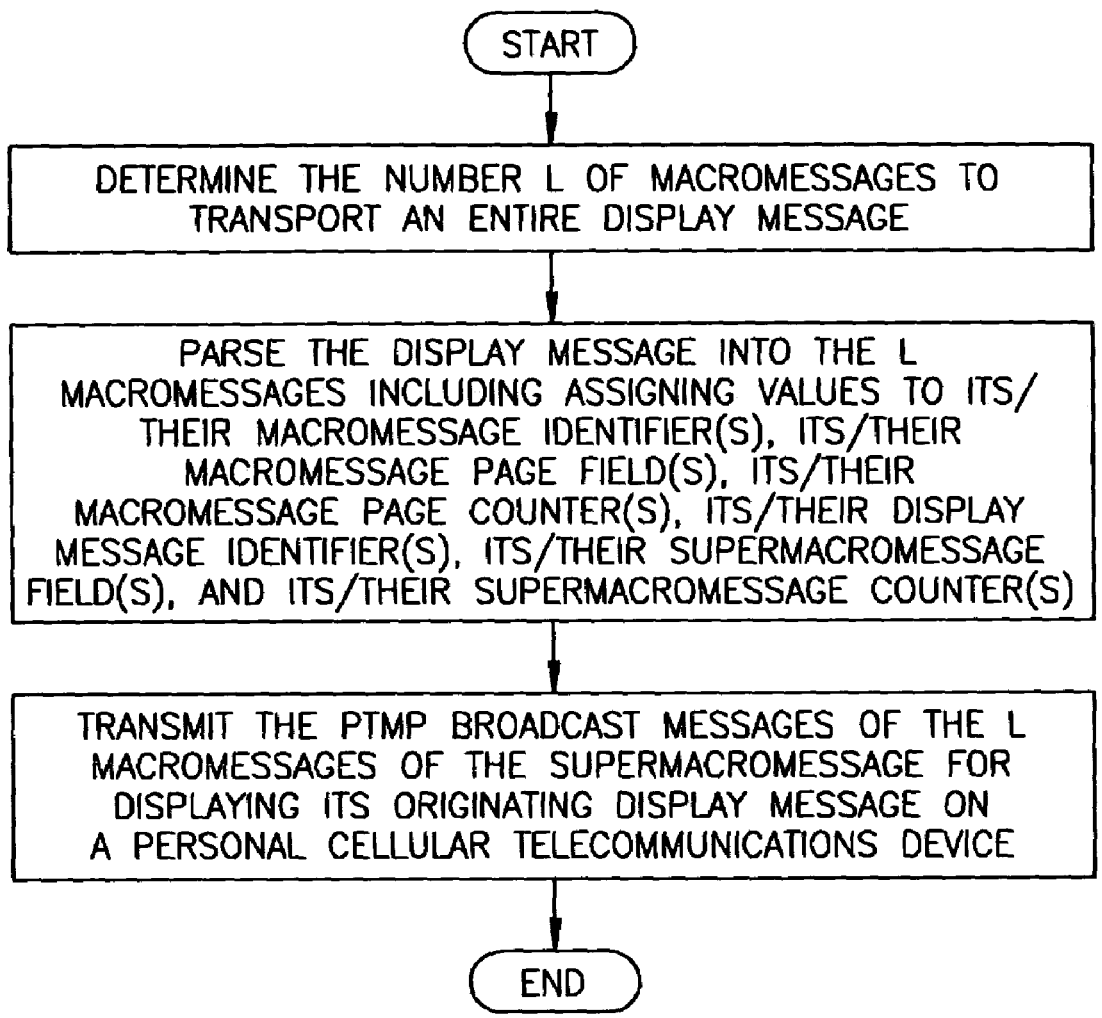
FIG. 11 is a flow diagram showing the parsing of a display message into macromessages of a supermacromessage ready for broadcasting in accordance with the present invention.
Figure 12:
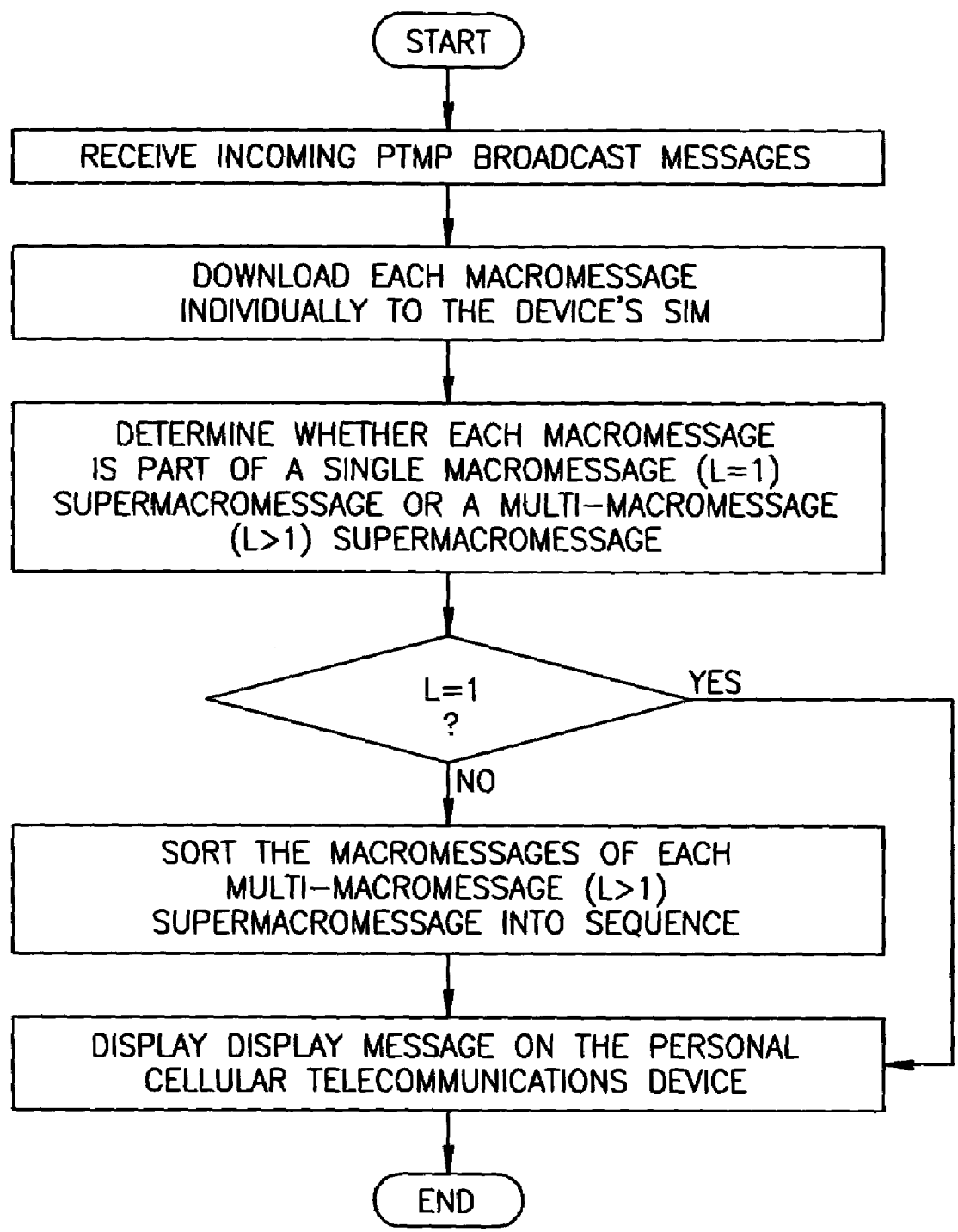
FIG. 12 is a flow diagram of a client application for displaying a display message on a macromessage compliant personal cellular telecommunications device in accordance with the present invention.

The operation of a GSM mobile telecommunications network 1 having only macromessage compliant devices 2B and macromessage compliant BSCs 4B is now described with reference to FIGS. 11 and 12. A CBC 3 initially determines the number L≧1 of macromessages required to transport an entire display message 27, and thereafter, the CBC 3 and a BSC 4B parse the display message 27 in the same manner as described hereinabove in connection with FIG. 6 without the assigning of values to the display message identifiers 21, the PTMP broadcast message fields 22 and the PTMP broadcast message counters of the $2^{nd}$ and up to $15^{th}$ PTMP broadcast message of each macromessage which are absent. On receiving incoming PTMP broadcast messages, the ME 6 of a device 2B automatically processes them by the macromessage information contained in their headers 12 to sort the PTMP broadcast messages of each macromessage. The ME 6 downloads intermediate messages which are derived from either a single macromessage (L=1) supermacromessage or a multi-macromessage (L>1) supermacromessage. Each intermediate message may contain from a single PTMP broadcast message up to 15 PTMP broadcast messages, and includes the header of the $1^{st}$ PTMP broadcast message, and its payload including its pseudo-header 18 and its payload remainder 19, and the full payloads of any additional PTMP broadcast messages. In the case that an intermediate message is derived from a single macromessage supermacromessage, the client application strips off the header 12 and the pseudo-header 18 of its first PTMP broadcast message for yielding the content of the display message for display on the device 2B. In the case that an intermediate message is derived from a multi-macromessage supermacromessage, the client application concatenates the two or more macromessages as identified by their display message identifiers 21 in sequence prior to displaying the display message on the device 2B.

Figure 13A:
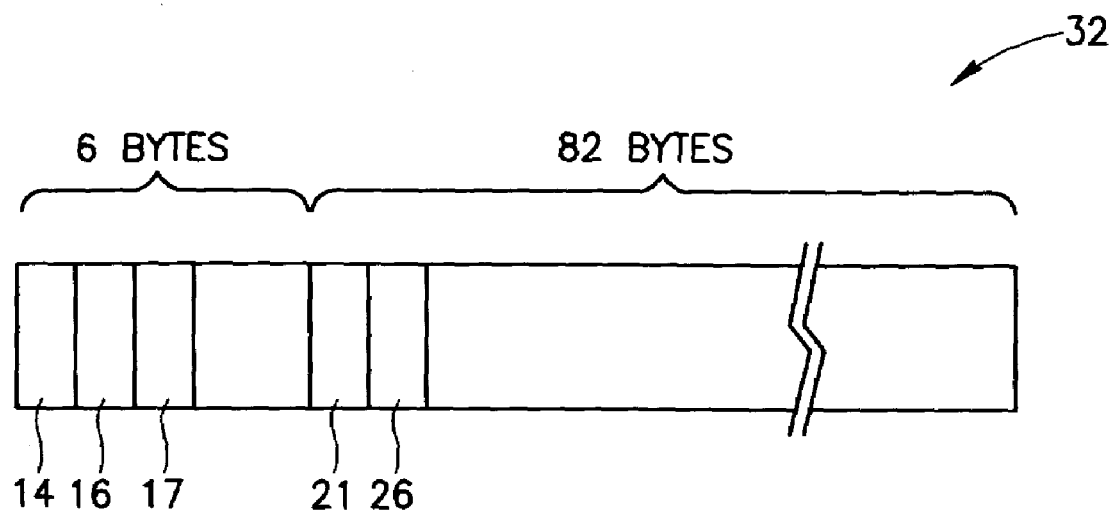
FIGS. 13A and 13B are schematic diagrams showing alternative embodiments of a GSM-type modified PTMP broadcast message for displaying display messages in accordance with the present invention.
Figure 13B:
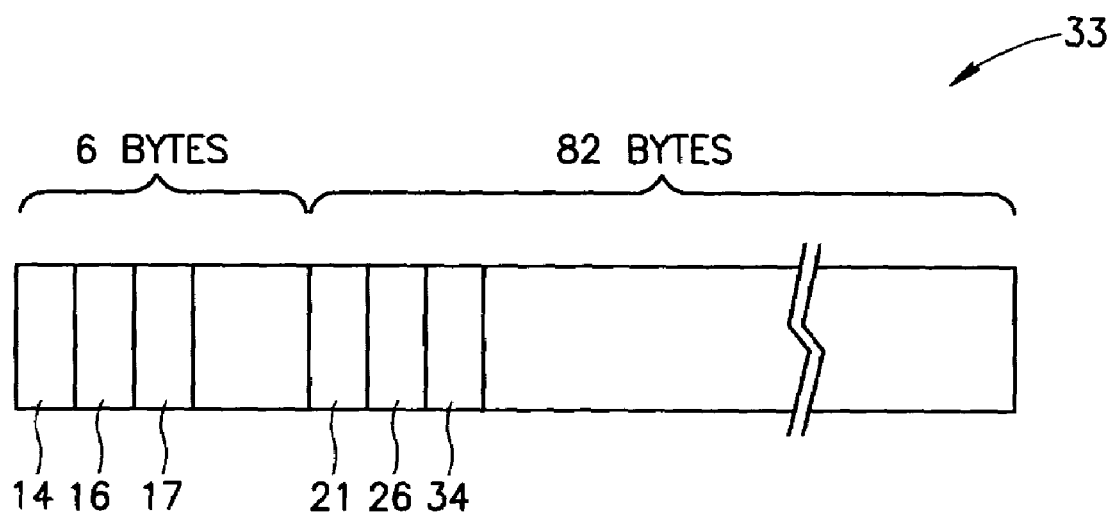

While the invention has been described with respect to a limited number of embodiments, it will be appreciated that many variations, modifications, and other applications of the invention can be made within the scope of the appended claims. For example, alternative means instead can be provided for enabling a personal cellular telecommunications device to determine the receipt of a complete display message or a complete supermacromessage. Thus, rather than providing each PTMP broadcast message with a PTMP broadcast message field 22, an end of display message symbol (constituting a complete display message indication means) can be employed in which case each PTMP broadcast message 32 for transporting a display message except the last would have the PTMP broadcast message counter 23 (see FIG. 13A) whilst the last PTMP broadcast message 33 for transporting a display message would have the PTMP broadcast message counter 23 and an end of display message symbol 34 (see FIG. 13B). The same approach may also be applied to supermacromessage information.

The invention claimed is:

1. For use in a mobile cellular telecommunications network for displaying a display message on a personal cellular telecommunications device, the display message being transportable over an air interface by $P \geq 1$ Point-To-Multi-Point (PTMP) broadcast messages each comprising a) a header including i) a macromessage identifier for identifying a macromessage; ii) a macromessage page field for specifying a total number of pages I in a macromessage where $K \geq I \geq 1$ and K is a predetermined maximum number of PTMP broadcast messages in a macromessage; and iii) a macromessage page counter for specifying a page number $J=(1, 2, \ldots, I-1, I \leq K)$ of a PTMP broadcast message in a macromessage, and b) a payload including a reserved pseudo-header and a payload remainder for storing actual content, the pseudo-header having i) a display message identifier for identifying a display message; and ii) a PTMP broadcast message counter $Q=(1, 2, \ldots, P-1, P)$ for specifying the location of a PTMP broadcast message in a sequence of P PTMP broadcast messages.

2. The message according to claim 1 wherein the pseudo-header further includes a complete display message indication means for enabling a personal cellular telecommunications device to determine the receipt of a complete display message.

3. The message according to claim 2 wherein the complete display message indication means is constituted by a PTMP broadcast message field for storing the value P.

4. The message according to claim 2 wherein the complete display message indication means is constituted by an end of display message symbol.

5. The message according to claim 1 wherein the pseudo-header further comprises a supermacromessage counter $M=(1, 2, \ldots, L-1, L)$ for specifying the location of a macromessage in a supermacromessage constituted by a sequence of $L \geq 1$ macromessages.

6. The message according to claim 5 wherein the pseudo-header includes a complete supermacromessage indication means for enabling a personal cellular telecommunications device to determine the receipt of a complete supermacromessage.

7. The message according to claim 6 wherein the complete supermacromessage indication means is constituted by a supermacromessage field for storing the value L.

8. The message according to claim 6 wherein the complete supermacromessage indication means is constituted by an end of supermacromessage symbol.

9. A method for broadcasting a display message for display on a personal cellular telecommunications device, the display message being transported over an air interface by one or more PTMP broadcast messages each comprising a) a header including i) a macromessage identifier for identifying a macromessage; ii) a macromessage page field for specifying a total number of pages I in a macromessage where $K \geq I \geq 1$ and K is a predetermined maximum number of PTMP broadcast messages in a macromessage; and iii) a macromessage page counter for specifying a page number $J=(1, 2, \ldots, I-1, I \leq K)$ of a PTMP broadcast message in a macromessage, and b) a payload including a reserved pseudo-header and a payload remainder for storing actual content, the pseudo-header having i) a display message identifier for identifying a display message; and ii) a PTMP broadcast message counter $Q=(1, 2, \ldots, P-1, P)$ for specifying the location of a PTMP broadcast message in a sequence of P PTMP broadcast messages, the one or more PTMP broadcast messages including at least one PTMP broadcast message having a complete display message indication means for enabling a personal cellular telecommunications device to determine the receipt of a complete display message, the method comprising the steps of:
 (a) determining the number $P \geq 1$ of PTMP broadcast messages for transporting the entire display message;
 (b) parsing the display message into the P PTMP broadcast messages including assigning the same identification number to its/their display message identifier(s);
 (c) assigning values $Q=(1, 2, \ldots, P-1, P)$ to its/their PTMP broadcast message counter(s) where Q is incremented for each PTMP broadcast message in the sequence of P PTMP broadcast messages;
 (d) completing the complete display message indication means of the at least one PTMP broadcast message(s) for enabling a personal cellular telecommunications device to determine the receipt of a complete display message; and
 (e) transmitting the P PTMP broadcast messages for display of its/their originating display message on a personal cellular telecommunications device.

10. The method according to claim 9 and further comprising the step of assigning the same identification number to its/their macromessage identifier(s) of each macromessage, assigning values $I \leq K$ to it/their macromessage page field(s), and values $J=(1, 2, \ldots, I-1, I \leq K)$ to its/their macromessage page counter(s).

11. The method according to claim 9 and wherein the PTMP broadcast messages each have a pseudo-header further including a supermacromessage counter $M=(1, 2, \ldots, L-1, L)$ for specifying the location of a macromessage in a supermacromessage constituted by a sequence of $L \geq 1$ macromessages, the PTMP broadcast messages including at least one PTMP broadcast message having a pseudo-header further including a supermacromessage counter $M=(1, 2, \ldots, L-1, L)$ for specifying the location of a macromessage in a supermacromessage constituted by a sequence of $L \geq 1$ macromessages with a complete supermacromessage indication means for enabling a personal cellular telecommunications device to determine the receipt of a complete supermacromessage, and further comprising the steps of:
 (f) determining the number L of macromessages for transporting the entire display message;
 (g) assigning values $M=(1, 2, \ldots, L-1, L)$ to the supermacromessage counter(s) of its/their P PTMP broadcast message(s) where M is incremented for each macromessage in the supermacromessage; and
 (h) completing the complete supermacromessage indication means of the at least one PTMP broadcast message(s) including a pseudo-header with the complete supermacromessage indication means for enabling a personal cellular telecommunications device to determine the receipt of a complete supermacromessage.

12. A mobile cellular telecommunications network for executing the method in accordance with claim 9.

13. A method for displaying a display message on a personal cellular telecommunications device, the method comprising the steps of:
 (a) receiving incoming PTMP broadcast messages each comprising a) a header including i) a macromessage identifier for identifying a macromessage; ii) a macromessage page field for specifying a total number of pages I in a macromessage where $K \geq I \geq 1$ and K is a predetermined maximum number of PTMP broadcast messages in a macromessage; and iii) a macromessage page counter for specifying a page number J=(1, 2, ..., I−1, I≦K) of a PTMP broadcast message in a macromessage, and b) a payload including a reserved pseudo-header and a payload remainder for storing actual content, the pseudo-header having i) a display message identifier for identifying a display message; and ii) a PTMP broadcast message counter Q=(1, 2, ..., P−1, P) for specifying the location of a PTMP broadcast message in a sequence of P PTMP broadcast messages; and (b) displaying a display message whose contents are derived solely from the payload remainder(s) of its P≧1 PTMP broadcast message(s) on the personal cellular telecommunications device.

14. The method according to claim 13 and further comprising the step of determining whether an incoming PTMP broadcast message is part of a single PTMP broadcast message (P=1) display message.

15. The method according to claim 13 and further comprising step (c) of sorting the PTMP broadcast messages of a multi-PTMP broadcast message (P>1) display message into sequence for display of the display message on the personal cellular telecommunications device.

16. The method according to claim 15 wherein step (c) includes processing at least the PTMP broadcast message counter of the PTMP broadcast messages of a multi-PTMP broadcast message (P>1) display message.

17. The method according to claim 13 and further comprising step (d) of sorting the macromessages of a multi-macromessage supermacromessage into sequence for display of the display message on the personal cellular telecommunications device.

18. The method according to claim 17 wherein step (d) includes processing at least the supermacromessage counter of the PTMP broadcast messages of a multi-PTMP broadcast message (P>1) display message.

19. The method according to claim 13 and further comprising step (e) of determining whether the personal cellular telecommunications device is macromessage compliant.

20. A client application for executing the method according to claim 13.

21. A smart card for executing the method according to claim 13.

22. A personal cellular telecommunications device for executing the method according to claim 13.

23. For use in a mobile cellular telecommunications network for displaying a display message on a macromessage compliant personal cellular telecommunications device, the display message being transportable over an air interface by one or more macromessages each containing up to K Point-To-MultiPoint (PTMP) broadcast messages where K is a predetermined maximum number of PTMP broadcast messages in a macromessage, a macromessage having at least one PTMP broadcast message comprising a) a header including i) a macromessage identifier for identifying a macromessage; ii) a macromessage page field for specifying a total number of pages I in a macromessage where K≧I≧1; and iii) a macromessage page counter for specifying a page number J=(1, 2, ..., I−1, I≦K) of a PTMP broadcast message in a macromessage, and b) a payload including a reserved pseudo-header and a payload remainder for storing actual content, the pseudo-header having i) a display message identifier for identifying a display message; and ii) a supermacromessage counter for specifying a macromessage number M=(1, 2, ..., L−1, L) in a sequence of L≧1 macromessages constituting a supermacromessage.

24. The message according to claim 23 wherein the pseudo-header further includes a complete supermacromessage indication means for enabling a personal cellular telecommunications device to determine the receipt of a complete supermacromessage.

25. The message according to claim 24 wherein the complete supermacromessage indication means is constituted by a supermacromessage field for storing the value L.

26. The message according to claim 24 wherein the complete supermacromessage indication means is constituted by an end of supermacromessage symbol.

27. A method for broadcasting a display message for display on a personal cellular telecommunications device, the display message being transported over an air interface by one or more macromessages each comprising at least one PTMP broadcast message each comprising a) a header including i) a macromessage identifier for identifying a macromessage; ii) a macromessage page field for specifying a total number of pages I in a macromessage where K≧I≧1; and iii) a macromessage page counter for specifying a page number J=(1, 2, ..., I−1, I≦K) of a PTMP broadcast message in a macromessage, and b) a payload including a reserved pseudo-header and a payload remainder for storing actual content, the pseudo-header having i) a display message identifier for identifying a display message; and ii) a supermacromessage counter for specifying a macromessage number M=(1, 2, ..., L−1, L) in a sequence of L≧1 macromessages constituting a supermacromessage, the one or more macromessages including at least one macromessage comprising at least one PTMP broadcast message having a pseudo-header with a complete supermacromessage indication means for enabling a personal cellular telecommunications device to determine the receipt of a complete supermacromessage, the method comprising the steps of:

(a) determining the number L≧1 of macromessages for transporting the entire display message;

(b) parsing the display message into the L macromessage(s) including assigning the same identification number to the display message identifier(s) of its/their PTMP broadcast message(s);

(c) assigning values M=(1, 2, ..., L−1, L) to the supermacromessage counter(s) of its/their PTMP broadcast messages where M is incremented for each macromessage in the sequence of L macromessage(s);

(d) assigning the same identification number to the macromessage identifier(s) of its/their PTMP broadcast message(s);

(e) assigning values I≦K to the macromessage page field(s) of its/their PTMP broadcast message(s);

(f) assigning values J=(1, 2, ..., I−1, I≦K) to the macromessage page counter(s) of its/their PTMP broadcast message(s);

(g) completing the complete supermacromessage indication means of the at least one PTMP broadcast message(s) having a pseudo-header including a complete supermacromessage indication means for enabling a personal cellular telecommunications device to determine the receipt of a complete supermacromessage; and (h) transmitting the PTMP broadcast message(s) of the L≧1 macromessage(s) for display of its/their originating display message on a personal cellular telecommunications device.

28. A mobile cellular telecommunications network for executing the method in accordance with claim 27.

29. A method for displaying a display message on a personal cellular telecommunications device, the method comprising the steps of:

(a) receiving incoming PTMP broadcast messages each comprising a) a header including i) a macromessage identifier for identifying a macromessage; ii) a macromessage page field for specifying a total number of pages I in a macromessage where $K \geq I \geq 1$; and iii) a macromessage page counter for specifying a page number $J=(1, 2, \ldots, I-1, I \leq K)$ of a PTMP broadcast message in a macromessage, and b) a payload including a reserved pseudo-header and a payload remainder for storing actual content, the pseudo-header having i) a display message identifier for identifying a display message; and ii) a supermacromessage counter for specifying a macromessage number $M=(1, 2, \ldots, L-1, L)$ in a sequence of $L \geq 1$ macromessages constituting a supermacromessage; and (b) displaying a display message whose contents are derived solely from the payload remainders of the PTMP broadcast messages of its $L \geq 1$ macromessages on the personal cellular telecommunications device.

30. The method according to claim 29 and further comprising step (c) of sorting the macromessages of a multi-macromessage supermacromessage into sequence for display of the display message on the personal cellular telecommunications device.

31. The method according to claim 30 wherein step (c) includes processing at least the supermacromessage counter of a macromessage of a multi-macromessage (L>1) supermacromessage display message.

32. A client application for executing the method according to claim 29.

33. A smart card for executing the method according to claim 29.

34. A personal cellular telecommunications device for executing the method according to claim 29.

* * * * *